(12) United States Patent
Usenia et al.

(10) Patent No.: US 12,085,109 B2
(45) Date of Patent: Sep. 10, 2024

(54) SINGLE POINT ACTUATION LOW-PROFILE LOCK RING FOR A MECHANICAL SEAL

(71) Applicant: A.W. CHESTERTON COMPANY, Groveland, MA (US)

(72) Inventors: Joseph Usenia, Manchester, NH (US); Alan Van Epps, Groveland, MA (US); Robert James Powers, Salem, MA (US)

(73) Assignee: A.W. CHESTERTON COMPANY, Groveland, MA (US)

(*) Notice: Subject to any disclaimer, the term of this patent is extended or adjusted under 35 U.S.C. 154(b) by 511 days.

(21) Appl. No.: 17/340,545

(22) Filed: Jun. 7, 2021

(65) Prior Publication Data

US 2021/0381541 A1 Dec. 9, 2021

Related U.S. Application Data

(60) Provisional application No. 63/035,512, filed on Jun. 5, 2020.

(51) Int. Cl.
| | |
|---|---|
| *F16J 15/34* | (2006.01) |
| *F16B 39/08* | (2006.01) |
| *F16B 39/12* | (2006.01) |
| *F16B 2/06* | (2006.01) |

(52) U.S. Cl.
CPC .............. *F16B 39/08* (2013.01); *F16B 39/12* (2013.01); *F16B 2/065* (2013.01)

(58) Field of Classification Search
CPC .. F16J 15/064; F16J 15/10; F16J 15/16; F16J 15/34; F16J 15/348; F16J 15/3492; F16J 15/40; G01M 13/005; F16B 39/08; F16B 39/12; F16B 2/065
See application file for complete search history.

(56) References Cited

U.S. PATENT DOCUMENTS

| | | | |
|---|---|---|---|
| 5,067,845 A | 11/1991 | Schlueter | |
| 6,305,869 B1 * | 10/2001 | Chen | B62K 15/00 403/DIG. 4 |
| 6,557,878 B2 * | 5/2003 | Chen | B62K 19/36 280/226.1 |

(Continued)

OTHER PUBLICATIONS

International Search Report and Written Opinion, PCT/US2021/036112, dated Oct. 7, 2021, 15 pages.

*Primary Examiner* — Daniel J Wiley
(74) *Attorney, Agent, or Firm* — Nelson Mullins Riley & Scarborough LLP; Anthony A. Laurentano

(57) ABSTRACT

A mechanical seal that employs a lock ring assembly having associated therewith a locking mechanism. The locking mechanism can include a nut element, such as a barrel nut, that allows an associated bolt element to adjust a tightening load and position while clamping occurs of the components of the mechanical seal. This adjustment flexibility removes or reduces unwanted bending stresses in the bolt element, thus allowing for more torque to translate directly to the lock ring. The barrel nut allows for more material to remain in the lock ring, thus providing for additional overall strength relative to a traditional locking element. The lock ring also includes a plurality of flex regions in the form of notches that allow the lock ring to flex when the main body is tightened about the shaft.

8 Claims, 4 Drawing Sheets

(56) References Cited

U.S. PATENT DOCUMENTS

| | | | | |
|---|---|---|---|---|
| 6,581,492 B1* | 6/2003 | Chen | | B62K 3/002 280/278 |
| 7,708,283 B2* | 5/2010 | Azibert | | F16J 15/3488 403/322.2 |
| 7,762,246 B2* | 7/2010 | Telford | | F41B 11/52 124/49 |
| 8,079,610 B2* | 12/2011 | Winefordner | | B62K 25/02 280/281.1 |
| 8,091,897 B2* | 1/2012 | Giard | | F16J 15/3488 277/416 |
| 8,646,733 B2* | 2/2014 | Radzinsky | | A61F 2/76 248/74.1 |
| 9,021,661 B2* | 5/2015 | Andel | | G01V 3/15 16/429 |
| 9,981,707 B1* | 5/2018 | Chen | | B62H 5/001 |
| 11,237,080 B2* | 2/2022 | Stronck | | G01M 13/005 |
| 11,608,898 B2* | 3/2023 | Azibert | | F16J 15/3464 |
| 2002/0101038 A1* | 8/2002 | Budrow | | F04D 29/124 277/370 |
| 2003/0220701 A1* | 11/2003 | Steinbarger | | A61F 2/76 623/38 |
| 2006/0079965 A1* | 4/2006 | Benson | | A61F 2/76 623/38 |
| 2007/0074917 A1* | 4/2007 | Jaenke | | F16B 2/065 180/65.1 |
| 2007/0267818 A1* | 11/2007 | Giard | | F16J 15/3488 277/370 |
| 2008/0145140 A1* | 6/2008 | Chen | | B62K 19/36 403/24 |
| 2011/0221136 A1* | 9/2011 | Dudek | | F16J 15/348 277/306 |
| 2014/0159316 A1* | 6/2014 | Cid | | F16J 15/3464 267/164 |
| 2014/0327238 A1 | 11/2014 | Bowman | | |
| 2020/0103310 A1* | 4/2020 | Stronck | | F16J 15/3492 |
| 2021/0381603 A1* | 12/2021 | Azibert | | F16J 15/3488 |
| 2023/0204107 A1* | 6/2023 | Powers | | F16J 15/40 277/370 |

* cited by examiner

SINGLE POINT ACTUATION LOW-PROFILE LOCK RING FOR A MECHANICAL SEAL

RELATED APPLICATION

This application claims priority to U.S. provisional patent application Ser. No. 63/035,512, filed on Jun. 5, 2020, and entitled SINGLE POINT ACTUATION LOW-PROFILE LOCK RING FOR A MECHANICAL SEAL, the contents of which are herein incorporated by reference.

BACKGROUND OF THE INVENTION

The present invention is directed to an improved, more efficient device and method to transfer torque from a tightening bolt to a lock ring in a mechanical seal.

Conventional mechanical seals, such as split mechanical seals and cartridge type seals, are employed in a wide variety of environments and settings, such as for example, in mechanical apparatuses, to provide a pressure-tight and fluid-tight seal. The mechanical seals are usually positioned about a rotating shaft or rod that is mounted in and protrudes from a stationary mechanical housing or stationary equipment. The mechanical seal is usually bolted to the outside of the housing at the shaft exit, thus preventing the loss of pressurized process fluid from the housing. Typical mechanical seals include face-type mechanical seals, which include a pair of sealing rings that are concentrically disposed about the shaft and are axially spaced from each other. The sealing rings each have sealing faces that are biased into sealing contact with each other by conventional biasing mechanisms. Usually, one seal ring remains stationary (i.e., the stationary seal ring) while the other ring is secured to the shaft and rotates therewith (i.e., the rotary seal ring). The mechanical seal prevents leakage of pressurized process fluid to the external environment by biasing the seal ring sealing faces in sealing contact with each other. The rotary seal ring is usually mounted in a holder or sleeve assembly which is concentrically disposed about the equipment shaft. Likewise, the gland assembly may be solid or have a pair of gland halves that are also secured together by a screw. The stationary seal ring is typically mounted within the gland assembly.

Conventional split mechanical seals can employ a pair of gland halves and a pair of holder halves that are secured together. The gland halves are typically secured together, as is known, by a pair of locking screws disposed at each end or side of the gland halves. The locking screws are then tightened, once the other seal components are assembled and tightened, thus securing together the seal halves. A drawback of conventional tightening mechanisms is that the user may inadvertently over-tighten the locking screws, thus applying unwanted pressure to an associated lock ring. The unwanted pressure can thus damage the lock ring.

Further, conventional cartridge types seals employ a sleeve component that mounts the stationary and rotary seal components together. The sleeve assembly is mounted within the gland component, and the sleeve assembly is rotatably connected to a shaft by the lock ring. A drawback of conventional lock ring assemblies is that they employ integrated set screws, which can be inadvertently overtightened and can damage the shaft. Further, if a set screw of other tightening mechanism fails, then the entire lock ring assembly needs to be replaced.

SUMMARY OF THE INVENTION

The present invention is directed to a mechanical seal that employs a lock ring assembly having associated therewith a locking mechanism. The locking mechanism can include a nut element, such as a barrel nut, that allows an associated bolt element to adjust a tightening load and position while clamping occurs of the components of the mechanical seal. This adjustment flexibility removes or reduces unwanted bending stresses in the bolt element, thus allowing for more torque to translate directly to the lock ring. The barrel nut allows for more material to remain in the lock ring, thus providing for additional overall strength relative to a traditional locking element. The lock ring also includes a plurality of flex regions in the form of notches that allow the lock ring to flex when the main body is tightened about the shaft.

The present invention is directed to a mechanical seal comprising a gland element, a sleeve component having an elongated sleeve portion and being disposed within the gland, and a lock ring assembly. The lock ring assembly includes a lock ring having a main body having a generally annular shape and having a top surface, an opposed bottom surface, and a circumferential surface, where the top surface has formed therein a plurality of openings that are sized and configured for receiving a centering element and the circumferential surface has a plurality of side openings formed therein that are sized and configured for receiving a set screw. The main body also includes a first cut-out section having a curved profile region forming part of a first flange portion and a second cut-out section forming part of a second flange portion. The first and second flange portions have a bolt opening formed therein. The main body also includes a plurality of notches that are circumferentially spaced apart to form flex regions. The seal further includes a bolt element that is sized and configured for seating in the bolt openings and a nut element, such as a barrel nut, having a cylindrical shape that is complementary in shape to the curved profile region of the first flange portion.

Further, the sleeve portion can also include one or more holes for receiving the set screw when mounted in the top openings formed in the lock ring.

The present invention is also directed to a lock ring assembly for a mechanical seal comprising a main body having a generally annular shape and having a top surface, an opposed bottom surface, and a circumferential surface. The top surface has formed therein a plurality of openings that are sized and configured for receiving a centering element and the circumferential surface has a plurality of side openings formed therein that are sized and configured for receiving a set screw. The main body also includes a first cut-out section formed in the main body and having a curved profile region forming part of a first flange portion, a second cut-out section formed in the main body and forming part of a second flange portion where the first and second flange portions have a bolt opening formed therein, and a plurality of notches formed in the main body and circumferentially spaced apart about the main body to form flex regions.

The lock ring can further include a bolt element that is sized and configured for seating in the bolt openings, and a nut element, such as a barrel nut, having a cylindrical shape that is complementary in shape to the curved profile region of the first flange portion. The lock ring assembly can also include one or more centering elements for mounting in one or more of the plurality of openings. Further, the sleeve portion can include one or more holes, and one or more set screws for mounting in one or more of the plurality of side openings can be configured to engage the hole of the sleeve portion.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION

The present invention is directed to a mechanical seal that employs a lock ring assembly having associated therewith a locking mechanism. The locking mechanism can include a barrel nut that allows an associated bolt to adjust a tightening position while clamping occurs of the components of the mechanical seal. The lock ring can be configured to seat the barrel nut, which requires less material be removed from the body of the lock ring relative to conventional devices, thus enhancing the structural integrity of the lock ring. Further, the locking mechanism and lock ring provide for a selected degree of adjustment flexibility by removing or reducing unwanted bending stresses in the bolt, thus allowing for more torque to translate directly to the lock ring.

As used herein, the term "shaft" is intended to refer to any suitable device in a mechanical system to which a seal can be mounted and includes shafts, rods and other known devices.

As used herein, the terms "axial" and "axially" refers to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

As used herein, the term "axially inner" refers to that portion of the stationary equipment and a seal assembly disposed proximate the mechanical system employing the seal assembly. Conversely, the term "axially outer" as used herein refers to the portion of stationary equipment and a seal assembly distal from the mechanical system.

As used herein, the term "radially inner" refers to the portion of the seal assembly proximate a shaft. Conversely, the term "radially outer" as used herein refers to the portion of the seal assembly distal from the shaft.

As used herein, the terms "stationary equipment," "stationary mechanical housing," and/or "static surface" are intended to include any suitable stationary structure housing a shaft or rod to which a seal having a gland is secured. Those of ordinary skill in the art will readily recognize that the gland assembly can form part of the mechanical seal or part of the stationary equipment.

As used herein, the terms "mechanical seal" and "sealing assembly" are intended to include any suitable structure that can be mounted about a shaft and to the stationary equipment to provide a fluid-tight seal. Examples of suitable mechanical seals includes solid seals, cartridge seals, split seals, and other known seal and sealing assembly types and configurations.

Figure 1:
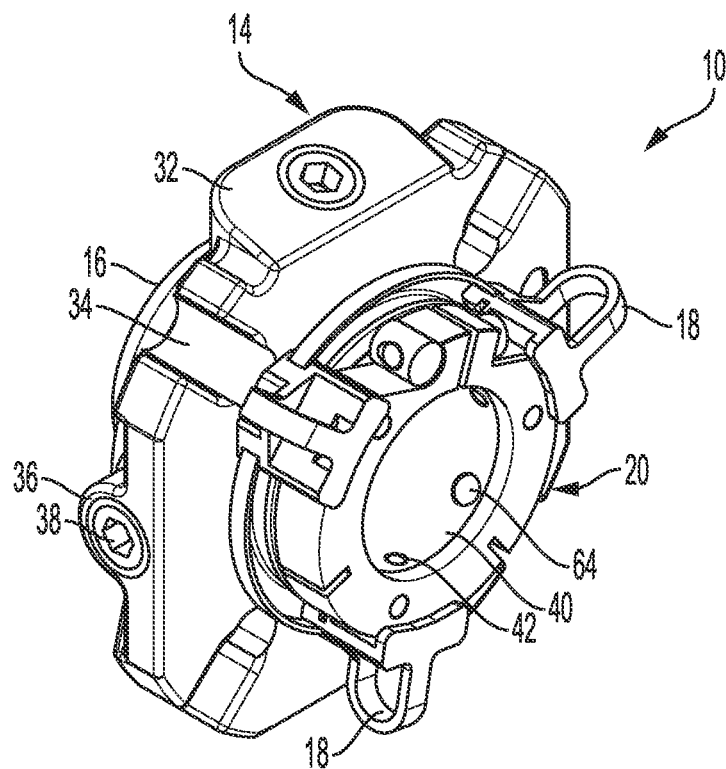
FIG. 1 is a perspective view of a mechanical seal employing a locking assembly according to the teachings of the present invention.
Figure 2:
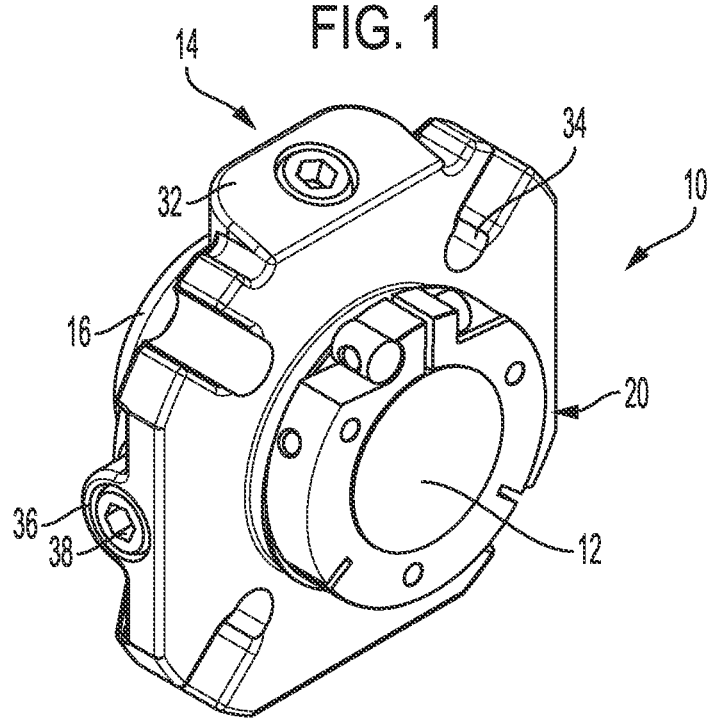
FIG. 2 is a perspective view of a mechanical seal employing a locking assembly according to the teachings of the present invention with the centering clips removed.
Figure 3:
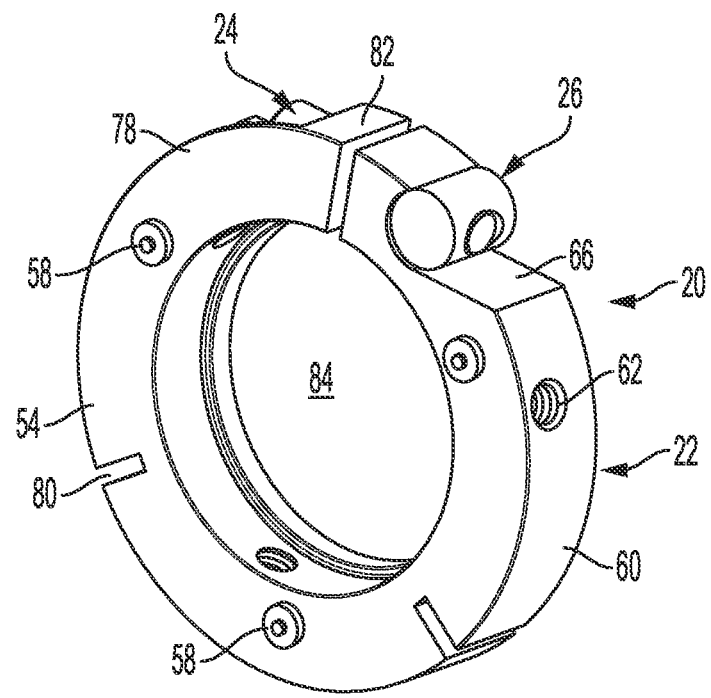
FIG. 3 is a rear perspective view of the lock ring of the locking assembly of the present invention.

FIGS. 1 and 2 are perspective views of the mechanical seal of the present invention. The illustrated mechanical seal 10 is preferably concentrically disposed about a shaft 12 that extends along a pump axis and is secured to an external wall of stationary equipment, such as a pump or other mechanical device (not shown). The shaft 12 may be mounted, at least partly, within or adjacent to the stationary equipment. The mechanical seal assembly 10 can be constructed to provide a fluid-tight seal, thereby preventing a process medium (e.g., fluid) from escaping the stationary equipment. The fluid-tight seal is achieved by sealing members, including a rotary seal ring and a stationary seal ring, as is known in the art. The seal rings can be split seal ring having a pair of seal ring segments. The seal rings can be disposed in operative sealing contact with each other to form a seal therebetween. The seal rings can be biased into sealing contact with each other by known biasing mechanisms, such as biasing rings and biasing springs. The seal rings provide a fluid-tight seal operable under a wide range of operating conditions.

The mechanical seal 10 can also include a gland component 14 and a holder or sleeve component 16 that seats within the gland component 14. The sleeve component 16 can have any selected shape or configuration, and in the illustrated embodiment is formed as a sleeve that is disposed about and is rotatably coupled to the shaft. The sleeve component 16 is disposed within the interior space formed by the gland component 14. A lock ring assembly 20 can be used to secure the sleeve component 16 to the shaft 12. A series of removeable centering clips 18 can be employed to help center the lock ring assembly 20 both axially and radially relative to the shaft 12. The centering clips 18 are removed prior to operation of the mechanical seal 10.

The gland component 14 can have a main body 32 that has a series of circumferentially spaced apart channels or grooves 34 that are configured for receiving fastening elements, such as bolts, for mounting the gland component 14 to the stationary equipment. The main body 32 can also have formed therein one or more fluid passages 36 for introducing or allowing communication to an inner region of the gland and hence the seal components with an externally supplied fluid, such as a barrier or flushing fluid. The fluid passages 36 can be sealed if desired with a suitable plug 38. The sleeve component 16 can have an elongated sleeve portion 40 at an outboard end and a flange portion (not shown) at an inboard end that defines a space for receiving and retaining the rotary seal ring. The sleeve component 16 can have any selected number of grooves (not shown) formed therein for seating one or more sealing elements for forming a fluid seal between the shaft and the gland component 14, as is known in the art.

FIGS. 3-6 show the details of the lock ring assembly 20 of the present invention. The illustrated lock ring assembly 20 includes a lock ring 22 that is sized and configured for seating about the shaft and for applying a radial pressure to the sleeve component 16 for locking coupling (e.g., locking) the sleeve component 16 to the shaft 12. As shown in FIGS.

Figure 8:
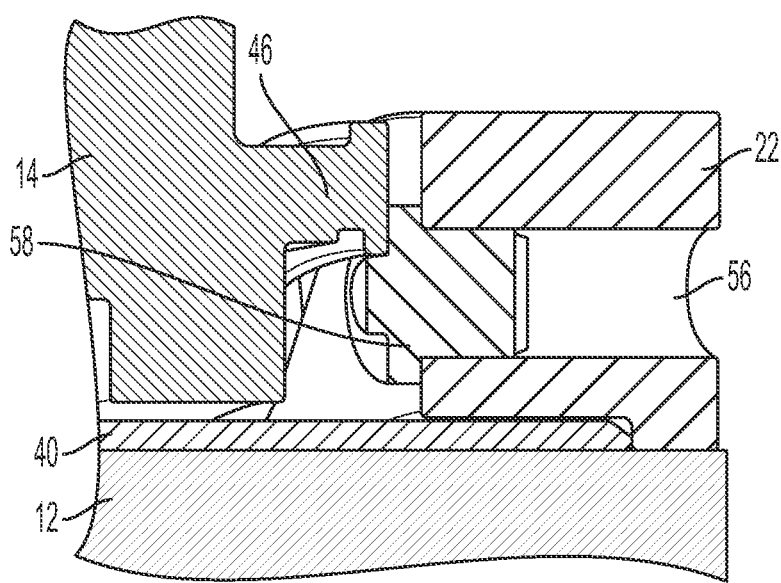
FIG. 8 is partial cross-sectional view of the lock ring assembly and the mechanical seal showing the positioning of the centering pin according to the teachings of the present invention.

3 and 4, the illustrated lock ring 22 has a main body 50 having a generally circular or annular shape. The main body 50 includes a top surface 52 and an opposed bottom surface 54. The top surface 52 has a plurality of openings 56 formed therein that terminate in the bottom surface 54 for seating centering elements 58. As shown for example in FIG. 8, the centering element 58 is mounted in the opening 56 and protrudes from the bottom surface 54 of the lock ring 22. The centering element 58 contacts a raised portion 46 of the gland element 16 so as to help center the lock ring 22 between the raised portion 46 and the shaft 12.

Figure 7:
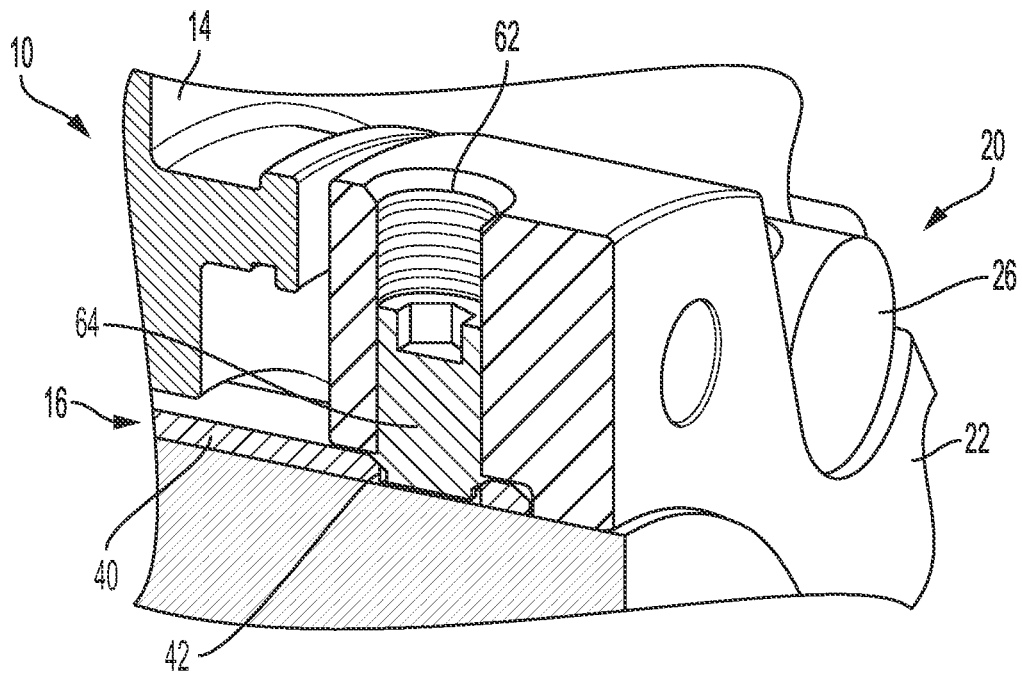
FIG. 7 is partial cross-sectional view of the lock ring assembly and the mechanical seal showing the positioning of a set screw according to the teachings of the present invention.

The main body 50 of the lock ring 22 also has a circumferential or peripheral surface 60. The circumferential surface 60 has a series of side openings 62 formed therein that are circumferentially spaced apart along the surface 60. The side openings 62 can be threaded so as to received a set screw 64, as shown in FIGS. 1 and 7. The set screw 64 seats within a hole or opening 42 formed in the sleeve portion 40 of the sleeve component 16. The set screw 64 in addition to the lock ring assembly 20 helps secure the sleeve component 16 to the shaft 12.

The circumferential surface 60 further has formed therein a pair of opposed cut-outs 66 and 68. The cut-outs 66, 68 form a pair of opposed flanges 70A, 70B, each of which has an opening 72 formed therein for receiving the bolt element 24. The flanges 70A, 70B can be coupled or secured together using the bolt element 24 and the nut element 26 of the lock ring assembly 20. The cut-out region 66 is configured to have a curved or cylindrical profile region 74 (e.g., when viewed in cross-section) having a selected radius that corresponds to the radius of the nut element 26. The cut-out 68 has a relatively flat cut-out section 76 that is configured for seating the bolt element 24. The cut-out region 68 is configured so as to form a wall portion 78 on the top surface 52 of the main body 50. The formation of the wall portion 78 provides for additional material to remain in the main body of the lock ring 22, thus enhancing the structural integrity thereof. The circumferential surface 60 also has formed therein a pair of circumferentially and spatially separated notches 80 that function as flex regions when the flanges 70A, 70B are secured together. Although two notches 80 are illustrated, one of ordinary skill in the art will readily recognize that any suitable number of notches can be employed. The notches partially extend into or across the width of the lock ring 22. The flanges 70A, 70B are separated by a space or gap 82. The lock ring 22 is thus configured as an annulus having a central opening 84 for seating about the shaft 12 and the sleeve component 16.

Figure 4:
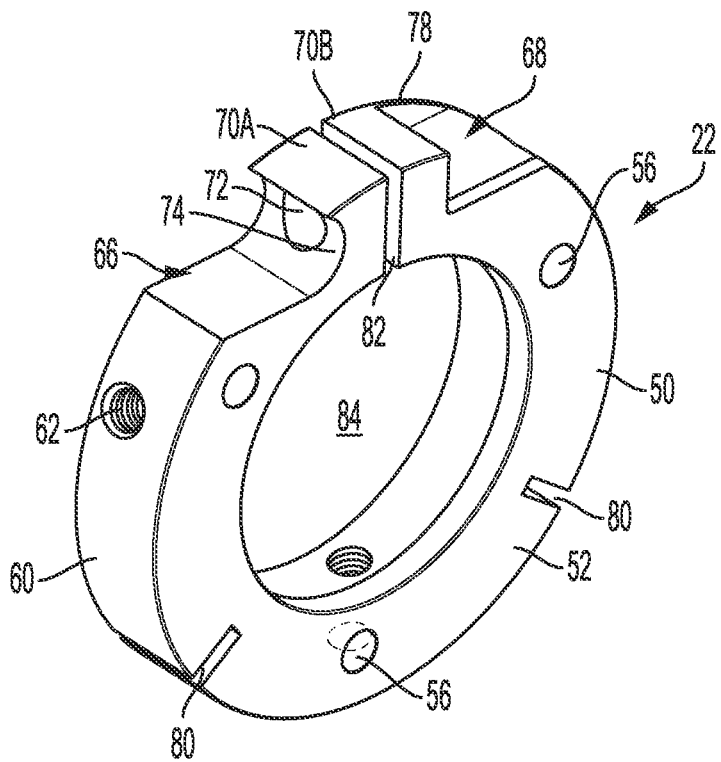
FIG. 4 is a front perspective view of the lock ring of the locking assembly of the present invention with the nut and bolt removed.
Figure 5:
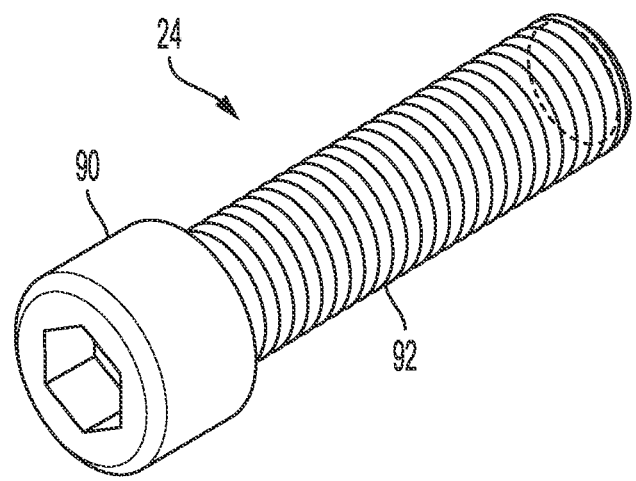
FIG. 5 is a perspective view of the bolt element of the lock ring assembly of the present invention.
Figure 6:
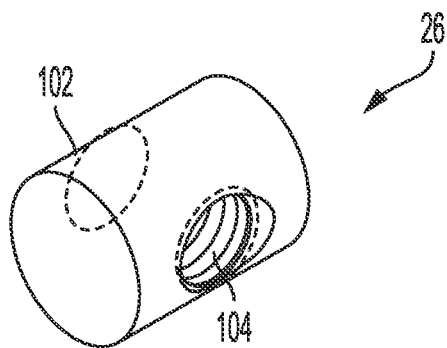
FIG. 6 is a perspective view of the nut element of the lock ring assembly of the present invention.

FIGS. 4 and 5 illustrate the bolt element 24 and the nut element 26, respectively. The illustrated bolt element 24 has a head portion 90 and a threaded stem portion 92. The bolt element 24 is sized and configured for passing through the openings 72 formed in the flanges 70A, 70B. The head portion 90 of the bolt element 24 is configured for seating in the cut-out 68 adjacent to the wall portion 78. The illustrated nut element 26 has a cylindrical main body 102 that has a threaded central opening 104 formed therethrough. The main body 102 is sized and configured for seating in the cut-out 66 and specifically in the cylindrical profile region 74. As such, the cylindrical shape of the nut is complementary in shape to the curved profile region 74. The nut element 26 is thus configured as a barrel nut. When mounted therein, the threaded stem portion 92 of the bolt element 24 engages with the threaded opening 104. The bolt can be tightened by a selected amount by the installer. As the bolt element is tightened, the flanges 70A, 70B are driven closer together along an arcuate path. The notches 80 forming the flex regions enable the flanges to follow the arcuate tightening path. One of ordinary skill in the art will readily recognize that the bolt element 24 and the nut element 26 can have any selected shape and size.

The present invention is thus directed to a lock ring assembly 20 for use with a mechanical seal, such as for example a cartridge type seal 10. The lock ring assembly 20 includes a lock ring 22, a bolt element 24, and a nut element 26 in the shape of a barrel nut. The bolt element 24 and the nut element 26 are used for securing and tightening the lock ring 22. The bolt element 24 can be tightened via a turning or torque action as the stem portion 92 of the bolt seats within the barrel nut 26. The barrel nut can include a threaded central opening 104. The shape and configuration of the lock ring 22 helps reduce the stress, such as a bending stress, in the bolt element 24, since there is a single point of tightening in the field, as compared to conventional lock rings that employ multiple set screws. Further, the illustrated lock ring 22 also applies a more uniform clamping force about the shaft 12. As a result, the applied energy via torque to the bolt element 24 serves to stretch rather than bend the bolt element. Further, the bolt element 24 and the barrel nut 26 can be replaced instead of replacing the entire lock ring assembly 20, as in conventional lock rings.

The lock ring 22 also has a shallow and relatively small cut-out region 66 that seats the barrel nut 26, and hence excess material does not need to be removed from the main body of the lock ring 22. The removal of only a small amount of material therefrom helps preserve the structural integrity of the lock ring 22. The main body 50 of the lock ring 22 also includes one or more, and preferably a plurality, of spaced apart notches 80. The notches 80 form flex regions that help reduce the energy required to apply a clamping force to the lock ring 22 during the tightening procedure. The tightening energy can thus go towards the clamping force and can be optimized. Further, the use of the bolt and nut provides for a single point of tightening as compared to prior art lock rings that employ multiple set screws.

The lock ring 22 and associated locking mechanism can employ a plurality of centering clips 18 that can be used to help center the shaft 12 within the mechanical seal. The centering clips 18 help center the lock ring both radially and axially. Further, the centering elements 58 can be employed to radially center the lock ring 22 relative to the shaft 12. The centering clips 18 also allow for better secure shipping and handling during transport without extra ordinary shipment packaging. The centering clips 18 are removeable prior to equipment operation.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A mechanical seal, comprising
   a gland element,
   a sleeve component having an elongated sleeve portion, the sleeve component being disposed within the gland, and a lock ring assembly including
  a lock ring having a main body having a generally annular shape and having a top surface, an opposed bottom surface, and a circumferential surface, wherein the top surface has formed therein a plurality of openings that are sized and configured for receiving a centering element and wherein the circumferential surface has a plurality of side openings formed therein that are sized and configured for receiving a set screw, wherein the main body includes a first inwardly extending cut-out section formed directly in the annular main body having a first curved profile region forming part of a first inwardly extending flange portion, and a second inwardly extending cut-out section formed directly in the annular main body and having a second curved profile forming part of a second flange portion, wherein the first and second flange portions have a bolt opening formed therein,
  a plurality of notches formed in the main body of the lock ring and circumferentially spaced apart about the main body to form flex regions,
  a bolt element that is sized and configured for seating in the bolt openings, and
  a nut element having a cylindrical shape that is complementary in shape to the curved profile region of the first flange portion.

2. The mechanical seal of claim 1, wherein the nut element is a barrel nut.

3. The mechanical seal of claim 1, further comprising one or more centering elements for mounting in one or more of the plurality of openings.

4. The mechanical seal of claim 1, wherein the sleeve component includes one or more holes, further comprising one or more set screws for mounting in one or more of the plurality of side openings, and wherein the set screw is configured to engage the hole of the sleeve component.

5. A lock ring assembly for a mechanical seal, comprising
a main body having a generally annular shape and having a top surface, an opposed bottom surface, and a circumferential surface, wherein the top surface has formed therein a plurality of openings that are sized and configured for receiving a centering element and the circumferential surface has a plurality of side openings formed therein that are sized and configured for receiving a set screw,
a first inwardly extending cut-out section formed in the main body and having a curved profile region forming part of a first inwardly extending flange portion,
a second inwardly extending cut-out section 68 formed in the main body having a curved profile region forming part of a second inwardly extending flange portion, wherein the first and second flange portions have a bolt opening formed therein,
a plurality of notches formed in the main body and circumferentially spaced apart about the main body to form flex regions,
a bolt element that is sized and configured for seating in the bolt openings, and
a nut element having a cylindrical shape that is complementary in shape to the curved profile region of the first flange portion.

6. The lock ring of claim 5, wherein the nut element is a barrel nut.

7. The lock ring of claim 5, further comprising one or more centering elements for mounting in one or more of the plurality of openings.

8. The lock ring of claim 5, further comprising one or more set screws for mounting in one or more of the plurality of side openings, and wherein the set screw is configured to engage a hole of a sleeve portion.

* * * * *